(12) United States Patent
Lynch

(10) Patent No.: US 9,256,983 B2
(45) Date of Patent: Feb. 9, 2016

(54) ON DEMAND IMAGE OVERLAY

(75) Inventor: James D. Lynch, Chicago, IL (US)

(73) Assignee: HERE Global B.V., Veldhoven (NL)

( * ) Notice: Subject to any disclaimer, the term of this patent is extended or adjusted under 35 U.S.C. 154(b) by 590 days.

(21) Appl. No.: 13/536,589

(22) Filed: Jun. 28, 2012

(65) Prior Publication Data
US 2014/0002440 A1    Jan. 2, 2014

(51) Int. Cl.
*G06T 1/00*       (2006.01)
*G06T 19/00*     (2011.01)

(52) U.S. Cl.
CPC ........... *G06T 19/00* (2013.01); *G06T 2219/004* (2013.01)

(58) Field of Classification Search
None
See application file for complete search history.

(56) References Cited

U.S. PATENT DOCUMENTS

| | | | |
|---|---|---|---|
| 6,895,126 B2 | 5/2005 | Di Bernardo et al. | |
| 7,577,316 B2 | 8/2009 | Di Bernardo et al. | |
| 7,978,207 B1 | 7/2011 | Herf et al. | |
| 8,493,408 B2 | 7/2013 | Williamson et al. | |
| 8,890,863 B1* | 11/2014 | Lininger | 345/419 |
| 2001/0010546 A1* | 8/2001 | Chen | 348/218 |
| 2003/0208771 A1* | 11/2003 | Hensgen et al. | 725/100 |
| 2005/0190972 A1 | 9/2005 | Thomas et al. | |
| 2005/0270286 A1 | 12/2005 | Hirvonen et al. | |
| 2006/0247855 A1 | 11/2006 | de Silva et al. | |
| 2007/0216189 A1 | 9/2007 | Matsumoto et al. | |
| 2008/0043020 A1 | 2/2008 | Snow et al. | |
| 2008/0266142 A1* | 10/2008 | Sula et al. | 340/995.17 |
| 2009/0153549 A1 | 6/2009 | Lynch et al. | |
| 2009/0213112 A1* | 8/2009 | Zhu et al. | 345/419 |
| 2009/0240431 A1 | 9/2009 | Chau et al. | |
| 2009/0245691 A1* | 10/2009 | Naimark et al. | 382/285 |
| 2009/0297067 A1* | 12/2009 | Yang | 382/325 |
| 2010/0004995 A1 | 1/2010 | Hickman | |
| 2010/0045678 A1* | 2/2010 | Reid | 345/427 |
| 2010/0138153 A1 | 6/2010 | Abe et al. | |
| 2010/0215250 A1* | 8/2010 | Zhu | 382/154 |
| 2010/0265177 A1 | 10/2010 | Fujimoto et al. | |
| 2010/0268452 A1 | 10/2010 | Kindo et al. | |
| 2010/0325589 A1 | 12/2010 | Ofek et al. | |
| 2011/0268316 A1 | 11/2011 | Bronder et al. | |
| 2011/0283223 A1 | 11/2011 | Vaittinen et al. | |

(Continued)

FOREIGN PATENT DOCUMENTS

| EP | 1024347 B1 | 2/2008 |
|---|---|---|
| EP | 1921419 A4 | 9/2011 |

OTHER PUBLICATIONS

"Visit global landmarks with photo tours in Google Maps", downloaded @http://google-latlong.blogspot.com/2012/04/visit-global-landmarks-with-photo-tours.html, posted on Apr. 25, 2012.*
U.S. Appl. No. 13/332,718, filed Dec. 21, 2011, Lynch.
U.S. Appl. No. 13/340,923, filed Dec. 30, 2011, Lynch.

(Continued)

*Primary Examiner* — Yingchun He
(74) *Attorney, Agent, or Firm* — Lempia Summerfield Katz LLC

(57) ABSTRACT

In one embodiment, a building model is presented to a user. The building model may be a three-dimensional rendering of a geographic region. A user selects a point on the three-dimensional rendering of a geographic region. Based on the selected point one or more image bubbles are chosen. The image bubbles are photographs or similar image data. The image bubbles and the three-dimensional rendering are associated with the same geographical space. The one or more image bubbles are incorporated with the building model such that at least a portion of one of the image bubbles is displayed in a window with the building model.

18 Claims, 17 Drawing Sheets

(56) References Cited

U.S. PATENT DOCUMENTS

2012/0033032 A1  2/2012  Kankainen
2012/0197464 A1  8/2012  Wang et al.
2013/0162665 A1  6/2013  Lynch
2013/0169668 A1  7/2013  Lynch
2014/0002439 A1  1/2014  Lynch
2014/0002440 A1  1/2014  Lynch

OTHER PUBLICATIONS

U.S. Appl. No. 13/536,536, filed Jun. 28, 2012, Lynch.
Farley, Zoom in with jQuery Plugin, Jul. 27, 2009, www.sitepoint.com/zoom-in-with-a-jquery-plugin.
Hile et al., Landmark-Based Pedestrian Navigation from Collections of Geotagged Photos, Dec. 3-5, 2008, p. 145-152, MUC.

* cited by examiner

ON DEMAND IMAGE OVERLAY

FIELD

The following disclosure relates to a method and system for navigation-related and/or mapping-related features, or more particularly, to a method and system for presenting street side imagery within a rendering of a geographic region.

BACKGROUND

Conventional street view involves the manipulation of image bubbles. Image bubbles are panoramic images collected with respect to a single perspective. The image bubbles may extend nearly 360 degrees along one or more axes. Zooming and panning within an image bubble provides a view from a particular viewpoint but cannot provide any perspective of the view with respect to surrounding areas. To view another perspective, a typical street level viewing application must be switched to the next image bubble. That is, in order to view the scene along the side of the street, a user selects a direction to move to the next image bubble and waits for the next image bubble to load. A panning operation may also be required, resulting in loading multiple images. Moreover, the relationship of the scene in the image bubble to the surrounding buildings or scenery is not conveyed using the conventional street view approach.

SUMMARY

In one embodiment, a building model is presented to a user. The building model may be a three-dimensional rendering of a geographic region. A user selects a point on the three-dimensional rendering of a geographic region. Based on the selected point one or more image bubbles are chosen. The image bubbles are photographs or similar image data. The image bubbles and the three-dimensional rendering are associated with the same geographical space. The one or more image bubbles are incorporated with the building model such that at least a portion of one of the image bubbles is displayed in a window with the building model.

BRIEF DESCRIPTION OF THE DRAWINGS

Exemplary embodiments of the present invention are described herein with reference to the following drawings.

DETAILED DESCRIPTION

The disclosed embodiments relate to a method and system for presenting street side imagery in combination with a rendering of a geographical area. Street side imagery includes photographic images or images derived from photographic images. The street side imagery may be collected from a camera at street level. The rendering of a geographic area is a model or representation of a portion of the Earth and objects on the surface of the Earth. Examples of three-dimensional renderings of a geographic area are available as part of services such as Google Earth, Nokia 3D Maps, Bing Maps Platform (formerly, Microsoft Virtual Earth). Virtual renderings may be found in other virtual earth software models, a light detection and ranging (LiDAR) point cloud, or a building model or footprint.

A point in the rendering of the geographical area is selected, and street side imagery for that point is retrieved from a database of images. Through this approach, high resolution street side imagery for mobile devices may be transmitted in an on-demand or as-needed basis, which reduces the bandwidth requirements of the system. Thus, any bottlenecks associated with the transmission of high resolution images for all of the buildings or surface objects can be avoided by loading only the textures or street side imagery requested by the user. In addition, this allows the use of an idealized rendering of the geographics area to reduce clutter and improve clarity. For example, symbolic building shapes with solid colors may be displayed for large scale navigation. Then, as the user demands a full detail view, the image database is queried for an optimal real-world view of the selected location.

The building model may be a three-dimensional rendering of a geographic region. Based on the selected point, one or more image bubbles are chosen. The image bubbles are photographs that contain a view of the selected point on the building model. The section of the image bubble that looks at the selected point is extracted and displayed as an overlay on the screen. The extracted image presents a view from a different, more advantageous viewpoint angle than the current view, which provides a targeted, real-world street-level view of the building as an on-demand operation. Such a simplified or symbolic (e.g. a non-textured city build shoebox model) interface is easy and efficient to understand and navigate, while allowing the user to view detailed building facades when desired. Further, one or more of these extracted image sections may also be projected onto the building model such that at least a portion of one of the image bubbles is draped over the three dimensional shape of building model.

Figure 1:
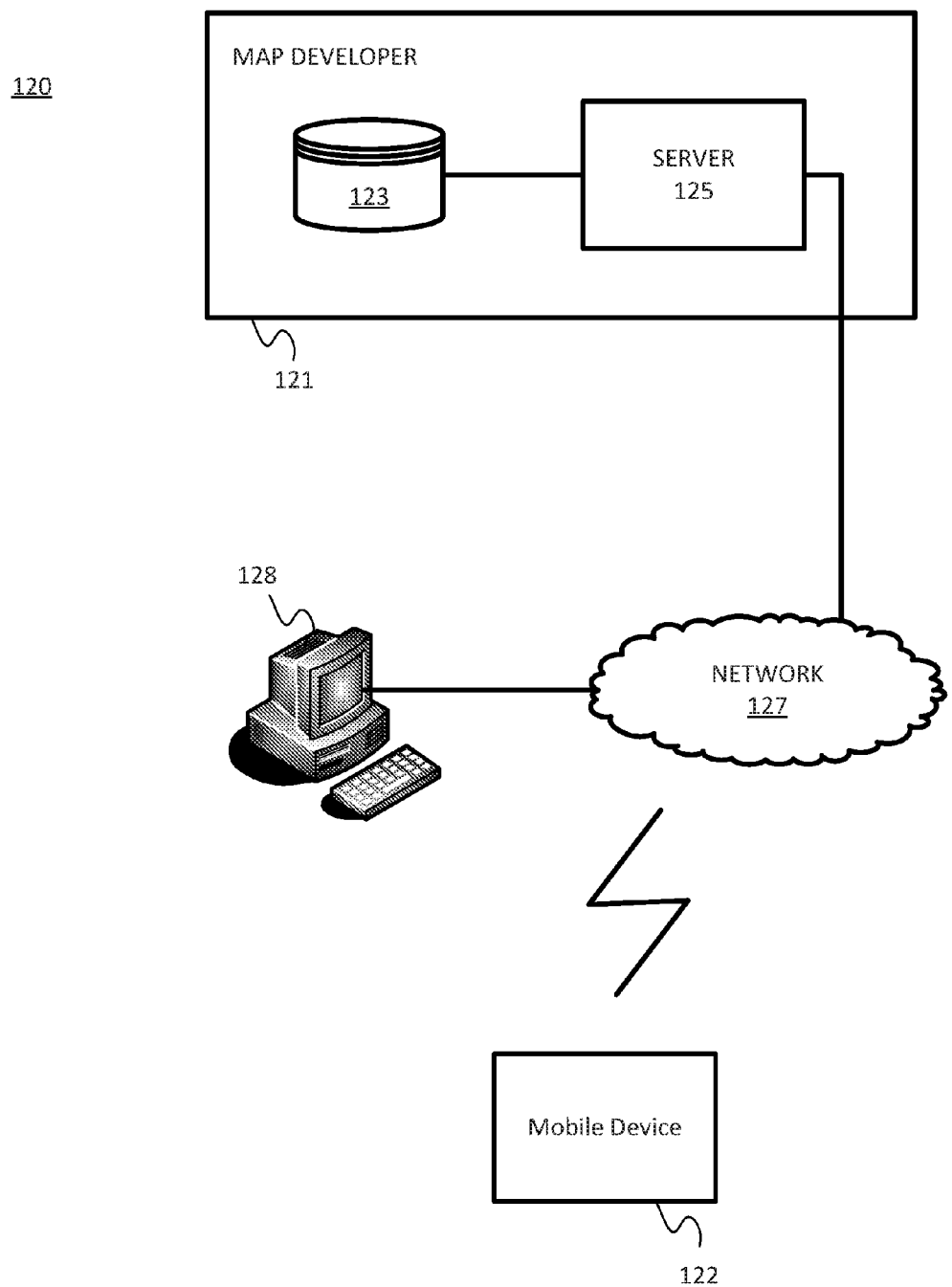
FIG. 1 illustrates an exemplary navigation system.

FIG. 1 illustrates an exemplary navigation system 120. The navigation system 120 includes a map developer system 121, a mobile device 122, a workstation 128, and a network 127.

Additional, different, or fewer components may be provided. For example, many mobile devices 122 and/or workstations 128 connect with the network 127.

The developer system 121 includes a server 125 and a database 123. The optional workstation 128 is a general purpose computer including programming specialized for the following embodiments. The workstation 128 includes at least a memory, a processor, and a communication interface. The developer system 121 may include computer systems and networks of a system operator (e.g., NAVTEQ or Nokia Corp.).

The mobile device 122 is a smart phone, a mobile phone, a personal digital assistant ("PDA"), a tablet computer, a notebook computer, a personal navigation device ("PND"), a portable navigation device, and/or any other known or later developed portable or mobile device. The mobile device 122 includes one or more detectors or sensors as a positioning system built or embedded into or within the interior of the mobile device 122. The mobile device 122 receives location data from the positioning system.

The developer system 121, the workstation 128, and the mobile device 122 are coupled with the network 127. The phrase "coupled with" is defined to mean directly connected to or indirectly connected through one or more intermediate components. Such intermediate components may include hardware and/or software-based components.

The computing resources necessary for overlaying street side imagery may be divided between the server 125 and the mobile device 122. In some embodiments, the server 125 performs a majority of the processing ("server-based embodiments"). In other embodiments, the mobile device 122 or the workstation 128 performs a majority of the processing ("endpoint-based embodiments"). In addition, the processing is divided substantially evenly between the server 125 and the mobile device 122 or workstation 128 ("hybrid embodiments"). As an example, the following initial discussion focuses on server-based embodiments.

The server 125 is configured to receive data indicative of a selection of a point. The point may correspond to a location on a three-dimensional rendering of a geographic region. The selection of the point may be made on the mobile device 122 or workstation 128. For example, the mobile device 122 or workstation 128 may display the three-dimensional rendering of the geographic region, and the user selects a desired location on a display through touch or a cursor and pointing device. Alternately, the selection location may originate from a routing algorithm, a point of interest destination, or advertising location.

The server 125 is configured to select an image bubble based on the point on the three-dimensional rendering of the geographic region. The server 125 may employ a variety of algorithms to select the image bubble. In one example, the image bubble collected at a location closest to the point on the three-dimensional rendering of the geographic region is selected. In other example, more complicated line of sight techniques or averaging techniques are used.

The server 125 is configured to associate at least a portion of the image bubble with an inset within the three-dimensional rendering of the geographic region. For example, the server 215 may generate a displayable image depicting the three-dimensional rendering of the geographic region with a picture-in-picture inset that includes an image from the image bubble. The displayable image may be transmitted from the server 125 to the workstation 128 or the mobile device 122 for presentation to the user.

The image bubbles include photographic image data collected by a camera. The image bubbles may be referred to as panoramic images and consist of a nearly 360 view range. The image bubbles may have center points measured in Cartesian coordinates, such as an X-coordinate, a Y-coordinate, and a Z-coordinate. The images may have a world orientation defined in three rotation angles or a quaternion. Each point on the image bubble is defined by the center point and one or more angles (e.g., roll, pitch, yaw). The camera may be mounted on a vehicle that moves along a street. The camera may collect an image bubble at regular time or distance intervals (e.g., 1 m, 5 m, 10 m, 1 second, 10 seconds, 100 milliseconds). The image bubbles are associated with the geographic location and orientation of the camera and/or vehicle at the time the image bubble is collected.

In addition, the vehicle may include a LiDAR device that collects and gathers data points in a point cloud. The data points may be matched with image bubbles based on location. The data points include location coordinates and an on or off value. An intensity value may be included in place of the on or off value. Alternatively, the data points may include a distance value and two angle values to signify a location of a point in the point cloud. The point cloud may be stored in ASCII or LiDAR exchange format. One or more lasers of the LiDAR device may be in a near infrared spectrum (such as about 700 nm to about 5000 nm or about 800 nm to about 2500 nm) or another light spectrum.

The database 123 of the navigation system 120 may be a geographic database. The geographic database 123 includes information about one or more geographic regions. Each road in the geographic region is composed of one or more road segments. A road segment represents a portion of the road. Each road segment is associated with two nodes (e.g., one node represents the point at one end of the road segment and the other node represents the point at the other end of the road segment). The node at either end of a road segment may correspond to a location at which the road meets another road, i.e., an intersection, or where the road dead-ends. The road segment data record may include data that indicate a speed limit or speed category (i.e., the maximum permitted vehicular speed of travel) on the represented road segment. The road segment data record may also include data that indicate a classification, such as a rank of a road segment that may correspond to its functional class. The road segment data may include data identifying what turn restrictions exist at each of the nodes which correspond to intersections at the ends of the road portion represented by the road segment, the name or names by which the represented road segment is known, the length of the road segment, the grade of the road segment, the street address ranges along the represented road segment, the permitted direction of vehicular travel on the represented road segment, whether the represented road segment is part of a controlled access road (such as an expressway), a ramp to a controlled access road, a bridge, a tunnel, a toll road, a ferry, and so on.

The navigation-related features may include a route calculation application. End users may access a route from an origin to a destination. The route calculation application determines the route for the end user to travel along the road segments to reach the desired destination. In order to calculate a route, the route calculation application is provided with data identifying a starting location (origin) and a desired destination location. In one embodiment, the starting location may be the end user's current position and the destination may be entered by the end user. Given at least the identification of the starting location (origin) and the desired destination location, the route calculation application determines one or more solution routes between the starting location and the destination location. A solution route is formed of a series of connected road segments over which the end user can travel from the starting location to the destination location. When the route calculation application calculates a route, the application accesses the geographic database 123 and obtains data that represent road segments around and between the starting location and the destination location. The road calculation application uses the data to determine at least one valid solution route from the starting location to the destination location. The at least one valid solution route may be displayed to the user in the rendering of the geographic region such that addresses or points of interest along the route may be selected to display street side imagery.

In one embodiment, the route calculation application may attempt to find a solution route that takes the least time to travel. The segment cost or travel time for the particular represented road segment considers the type of road, such as freeway or residential street, speed limit and distance of the segment. In one embodiment, the route calculation application may consider traffic conditions to more accurately reflect actual travel time over the connected road segments. When the route calculation application determines one or more solution routes comprising the series of connected road segments, the travel times for each of the included connected road segments is summed to provide an estimated route travel time. Based on the route travel time, the route calculation application selects the quickest route. Once the route calculation application has selected the route, the route calculation application provides an output in the form of an ordered list identifying a plurality of road segments that form the continuous navigable route between the origin and the destination. In addition, the route calculation program provides an output of an estimated route travel time.

The map-related features may be any of the navigation-related features provided to the user without reference to the current location of the user or the device. In addition, map-related features may include display and manipulation of a map of a geographic region. The map-related features may be provided without navigation-related features.

The database 123 may also store image bubbles and three-dimensional renderings of geographic regions. The road segments may be tied to the image bubbles and renderings of geographic regions. The mobile device 122 or workstation 128 may receive an input from a user to select a point along a route or on a map to display a portion of an image bubble in combination with the rendering of the geographic region.

Figure 2:
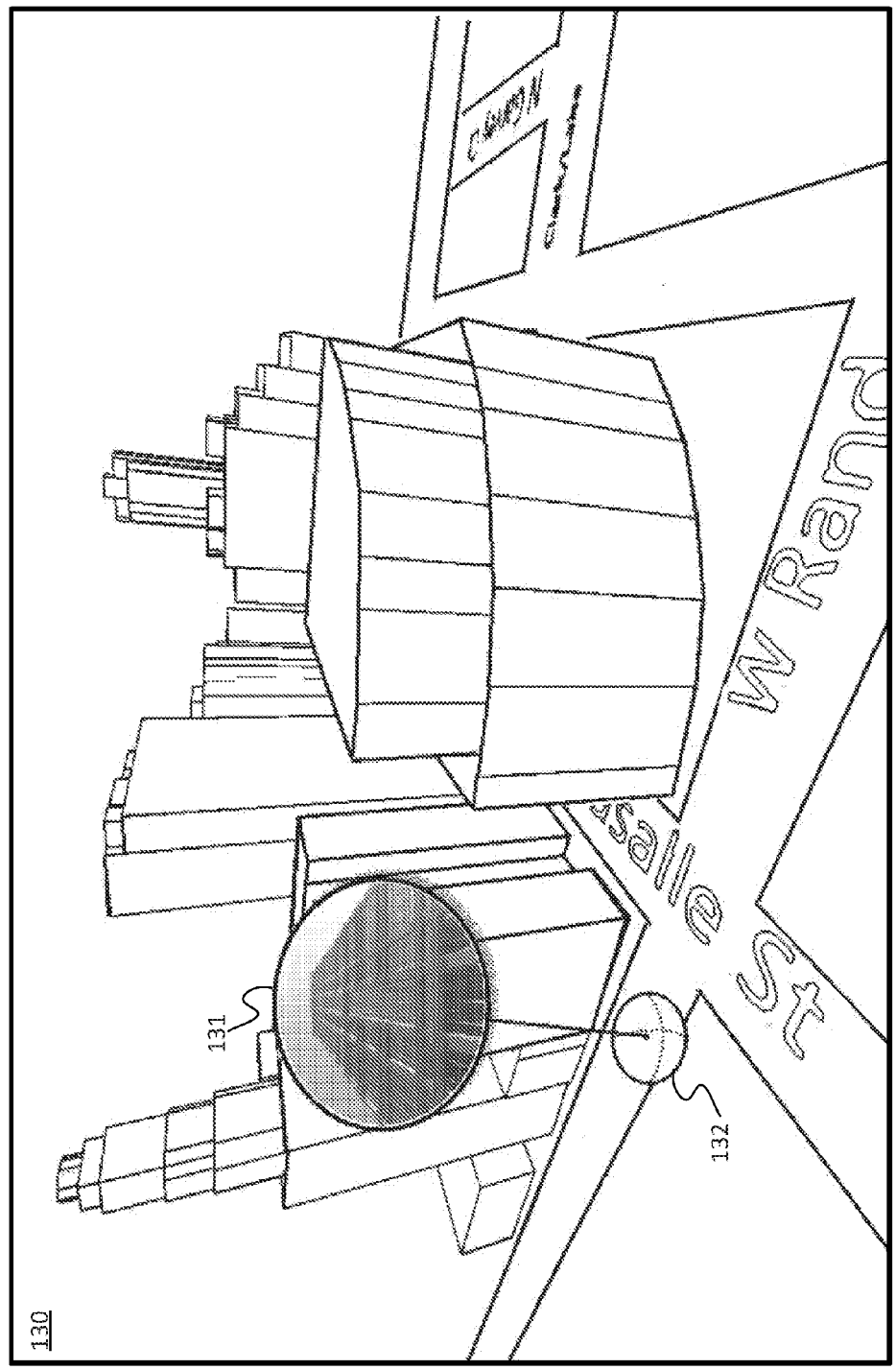
FIG. 2 illustrates an exemplary perspective view including on-demand street side imagery.

FIG. 2 illustrates an exemplary perspective view 130 including an on-demand street side imagery inset 131 overlaid on a three-dimensional rendering of a particular geographic region. The inset view is the result of a user picking the location of the top of the building beneath the inset. In the example of FIG. 2, the geographic region in the intersection of Lasalle St. and Randolph St. in Chicago, Ill. is displayed. The street side imagery 131 is a portion of the image bubble 132 that looks toward the selected location on the building. The image bubble 132 may or may not be shown on the perspective view 130 for additional reference. The image bubble 132 may have been collected at the location shown in FIG. 2. The street side imagery 131 may be photograph quality or photograph like quality. The street side imagery may be at a relatively high resolution.

The three-dimensional rendering of the particular geographic region may be an outline, as shown by FIG. 2, from a LiDAR point cloud, a computer generated building model, or another model. The model may or may not include textures on the faces of the buildings. The three-dimensional rendering of the particular geographic region may be at a relatively low resolution. Thus, the resolution of the street side imagery is greater than the resolution of the three-dimensional rendering of the particular geographic region. Alternatively, the three-dimensional rendering may include aerial or satellite photography, in which case the resolution of the three-dimensional rendering may be equivalent or near the resolution of the street side imagery. The model may consist of a stylized view of the environment such that the buildings may be symbolic representations that are easier to understand than their real-world counterpart.

Figure 3:
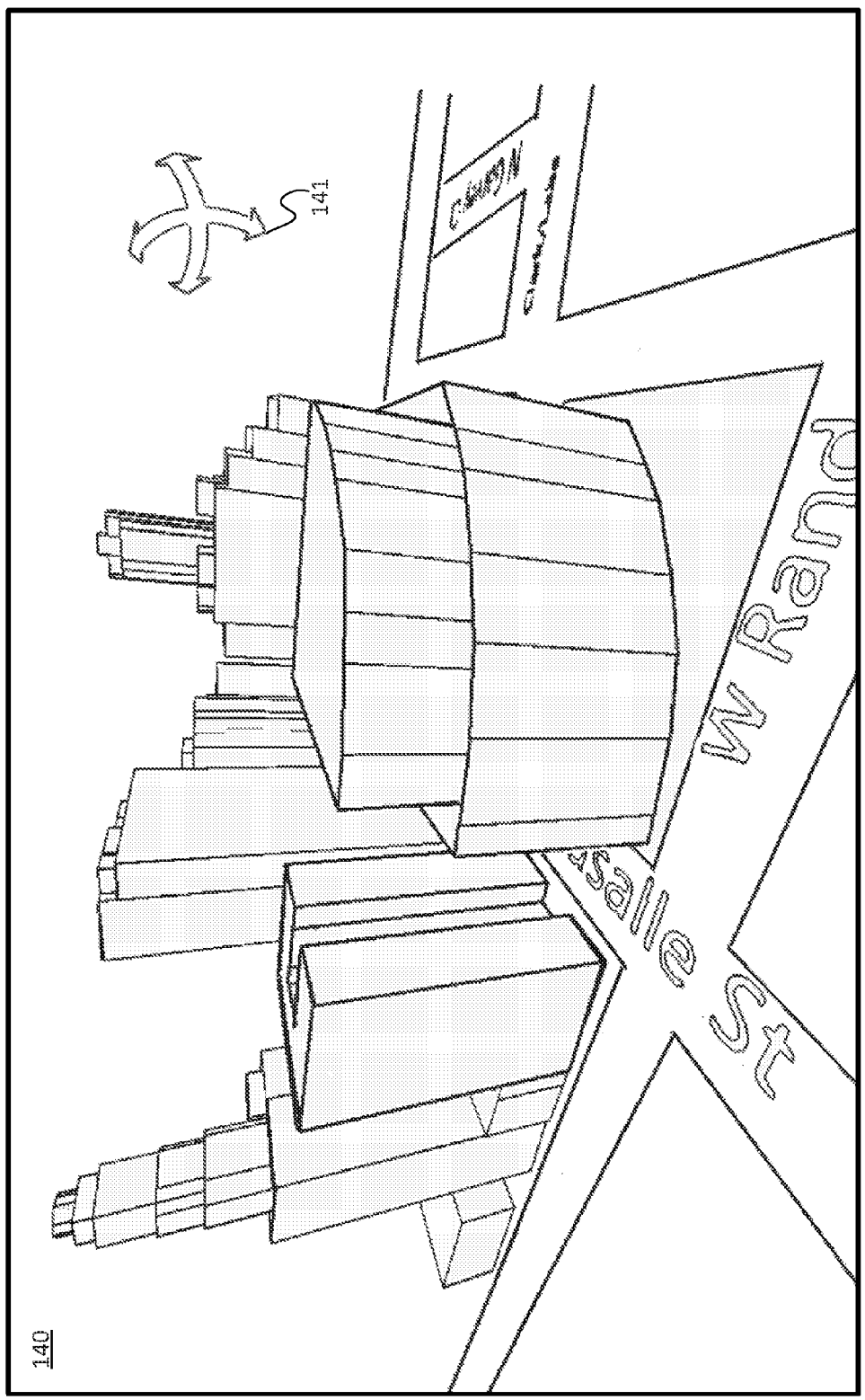
FIG. 3 illustrates an exemplary perspective view for use with on-demand street side imagery.

FIG. 3 illustrates an exemplary perspective view interface 140 for use with street side imagery. The perspective view 140 may be selected by the user. In one example, arrow keys or another input device control the multiple-axis rotation and location of the three-dimensional rendering, as shown by arrows 141. The three-dimensional rendering may include building outlines as a set of polygons.

Figure 4:
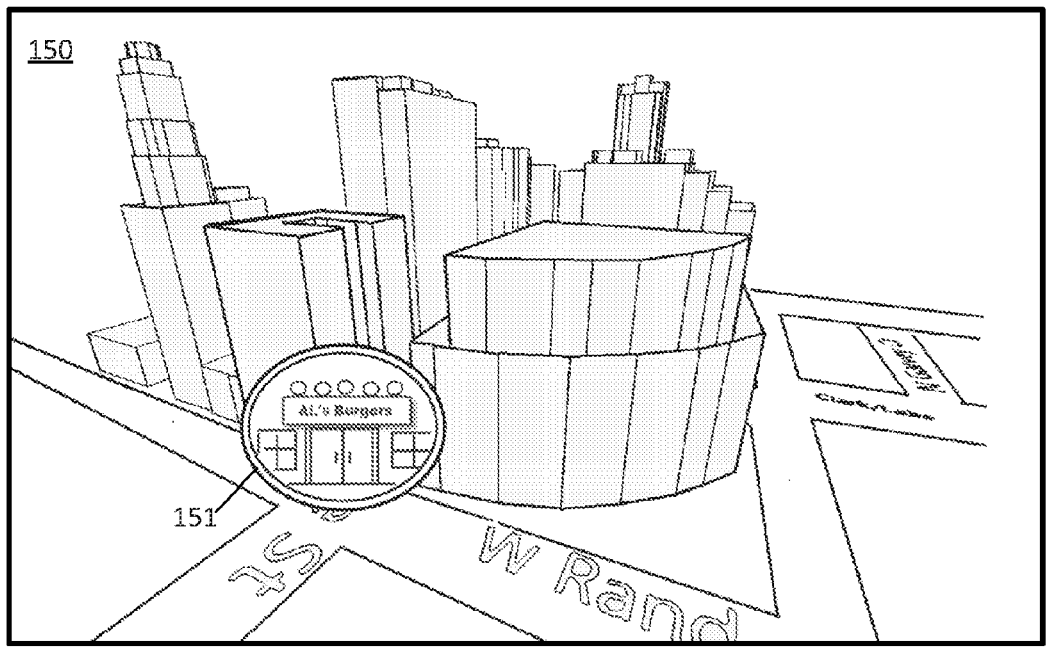
FIG. 4 illustrates another exemplary perspective view including on-demand street side imagery.

FIG. 4 illustrates a perspective view 150 including street side imagery 151. The location of the street side imagery 151 in the perspective view 150 corresponds to the location of the subject matter in the street side imagery 151. That is, the window inset is placed at a location that corresponds to the object depicted in the window inset. The street side imagery 151 in FIG. 4 depicts the front door at street elevation of the building. If the user requests to view the AL's Burgers storefront, the street side imagery 151 may be transmitted more quickly and at lower cost than if high resolution images were transmitted for the entire building or entire perspective view 150.

Figure 5:
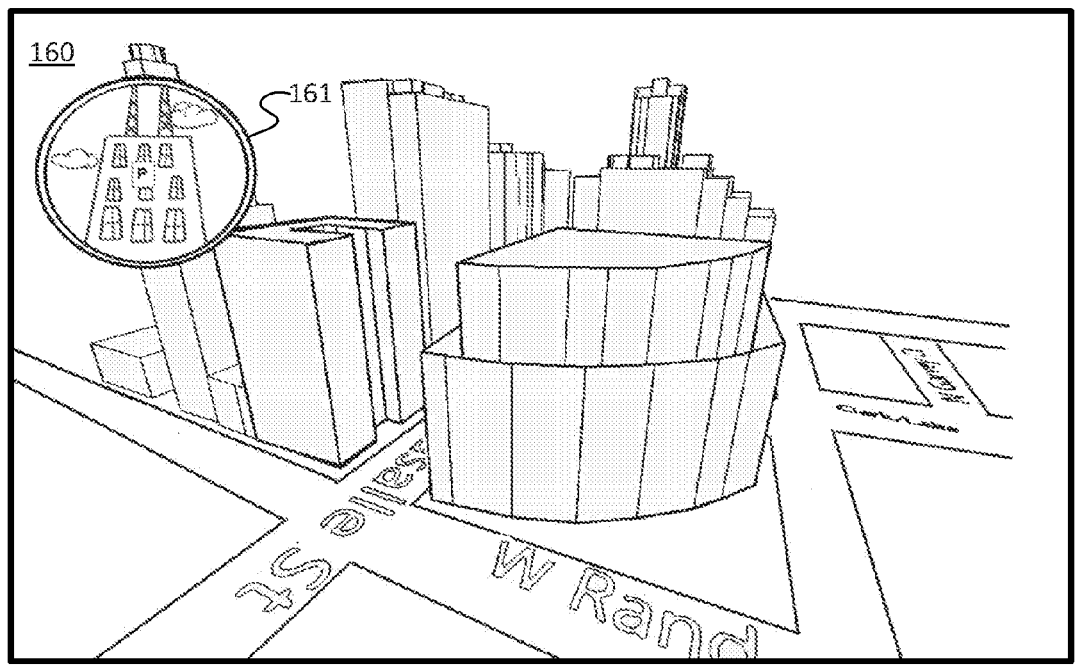
FIG. 5 illustrates another exemplary perspective view including on-demand street side imagery.

FIG. 5 illustrates another exemplary perspective view 160 including street side imagery 161. The location of the street side imagery 161 in the perspective view 160 also corresponds to the location of the subject matter. Street side imagery 161 is the top of the building as seen from the street level elevation. FIGS. 4 and 5 illustrates that the street side imagery may include subject matter at different elevations even when the street side imagery is collected at the same elevation. In this case, the vector from the image bubble center to the selected building location angles steeply upward. Therefore, the extracted portion of the image bubble is taken from the upper part of the image bubble instead if a side facing section. If the user requests to view the top of the building, the street side imagery 161 may be transmitted more quickly and at lower cost that if high resolution images were transmitted for the entire building or the entire perspective view 160.

Figure 6:
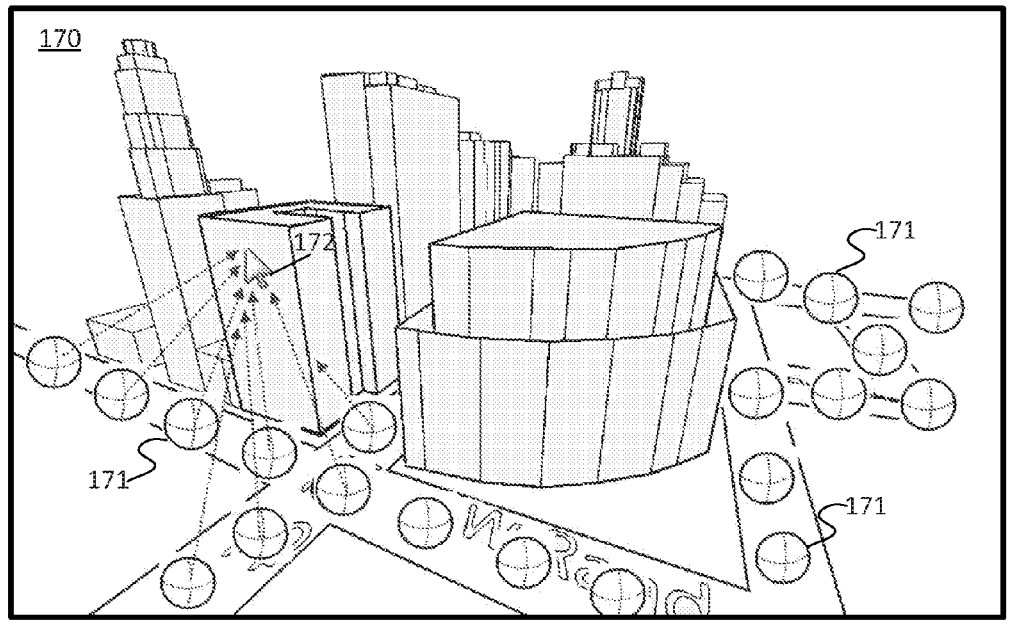
FIG. 6 illustrates an example set of image bubbles corresponding to the exemplary perspective view of FIG. 5.
Figure 7:
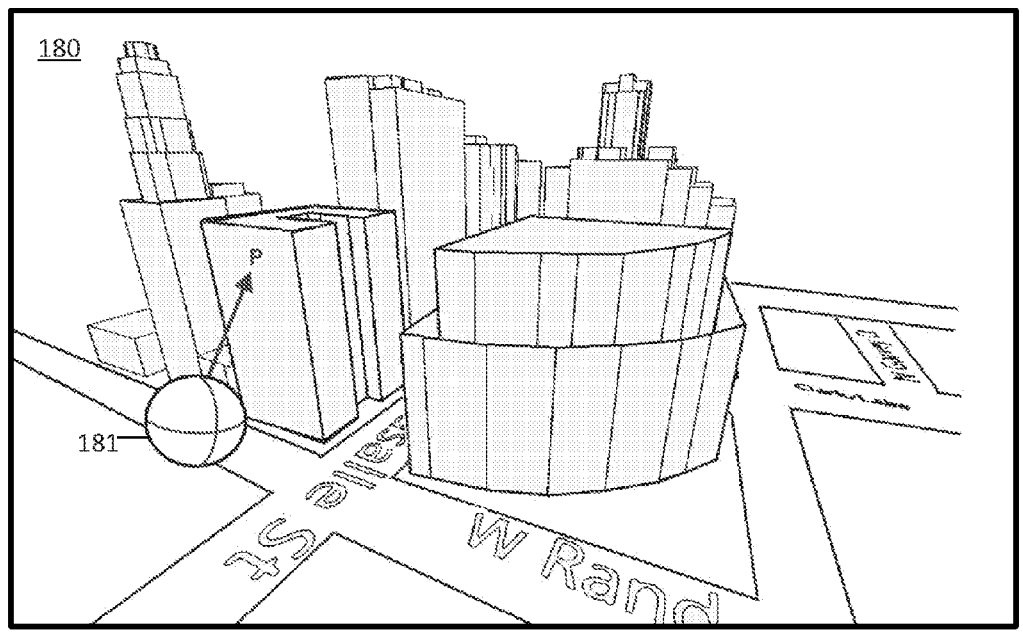
FIG. 7 illustrates one embodiment of an optimum image bubble.

FIG. 6 illustrates a set of image bubbles 171 corresponding to the exemplary perspective view 170. The image bubbles 171 were collected by a moving vehicle at distance intervals or time intervals. The server 125, the mobile device 122, or the workstation 128 is configured to compare the image bubbles in order to determine an optimum image bubble. FIG. 7 illustrates such an optimum image bubble 181 for selection point P.

Example algorithms to determine the optimal image bubble includes a distance algorithm, an indexing algorithm, a surface normal algorithm, and a line of sight algorithm. Each of the example algorithms may be performed by the server 125, the mobile device 122, or the workstation 128. In each of the algorithms, a geographically referenced location is determined from the selection of the point on the three-dimensional rendering of the geographic region. The set of image bubbles 171 are identified based on the geographically referenced location.

In the distance algorithm, a distance of each of the set of image bubbles 171 to the point 172 selected on the three-dimensional rendering is determined. The distance may be determined using two or three location components in the Cartesian coordinate system. The distance may be calculated as the square root of the sum of the squared differences of each coordinate of the location of the image bubble and the location of the point 172. The distances are compared, and the image bubble having the smallest distance to the three-dimensional rendering is selected as the optimum image bubble 181.

In the indexing algorithm, a lookup table associates each of the set of image bubbles 171 with one or more addresses, geographic locations, address range, or geographic location range. The lookup table may be stored in database 123 or internally to the mobile device 122 or server 125. The lookup table is queried with an address or the coordinates of a geographic location and returns the optimum image bubble 181.

The surface normal algorithm analyzes the direction of the selected surface plane and selects an image that best faces the surface. For example, if a billboard sign were selected, the closest image may only view the sign from the side of the billboard. In such a case, the billboard would not be readable from such a steep angle. Instead, the surface normal of the billboard selection is used to make sure the closest image bubble is taken than also views the billboard straight on instead of the front the side. The algorithm may also take into account the view angle and location of the current three-dimensional virtual viewpoint.

The line of sight algorithm utilizes with the three dimensional model geometry, depth information or both to determine the optimum image bubble 181. The three-dimensional model geometry may include three-dimensional polygons to perform ray-polygon intersections to determine which image bubbles are not obstructed by buildings or other polygon models.

In addition, depth information for each image bubble may be used to determine if the selected point location is visible from the bubble. The image depth information may be derived from LiDAR data or another depthmap and describes a distance from the location where the depth information was collected to an object at every view angle in the image. This depthmap information provides detailed visibility data that may not exist in the three-dimensional polygon model such as trees. The server 125, the mobile device 122, or the workstation 128 is configured to compare the depth information to the geographically referenced location determined from the selection of the point 172 on the three-dimensional rendering of the geographic region. If the depth information and the geographically reference location are within a threshold of each other, the image bubble has a line of sight to the selected point. Each of the image bubbles with line of sight may be considered a preferred image bubble. The line of sight may be pre-stored on a server to indicate which buildings are visible in each image. The server 125, the mobile device 122, or the workstation 128 may subsequently apply the distance algorithm to select the closest image bubble from among the preferred image bubbles with line of sight.

Figure 8:
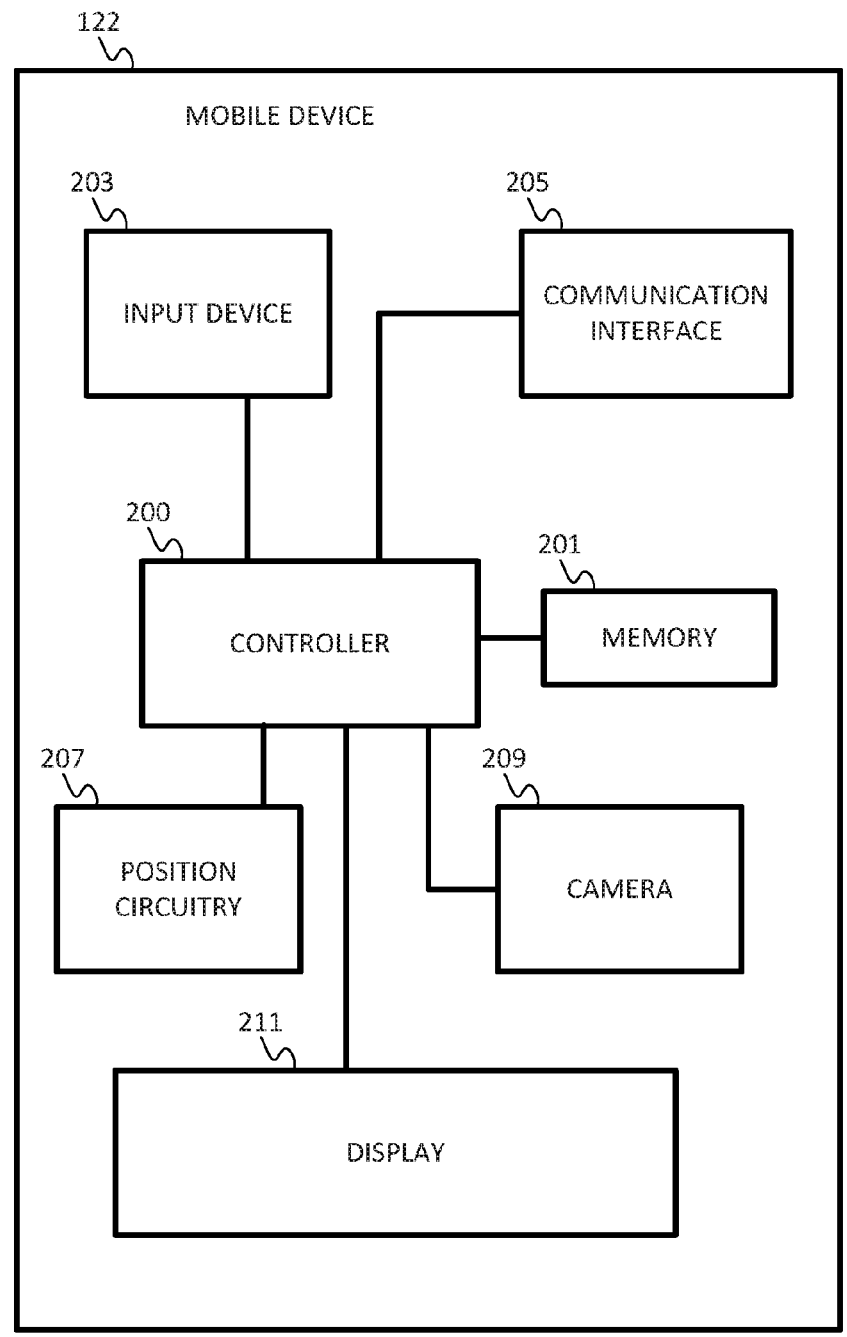
FIG. 8 illustrates an exemplary mobile device of the navigation system of FIG. 1.

FIG. 8 illustrates an exemplary mobile device 122 of the navigation system of FIG. 2. The mobile device 122 may be referred to as a navigation device. The mobile device 122 includes a controller 200, a memory 201, an input device 203, a communication interface 205, position circuitry 207, a camera 209, and a display 211. The workstation 128 may include at least a memory and processor and may be substituted for the mobile device in the following endpoint-based embodiments. In the following endpoint-based embodiments, the mobile device 122 or the workstation 128 performs a majority of the processing.

As opposed to the server-based embodiments discussed above, in the endpoint-based embodiments, the memory 201 is configured to store image bubbles. The memory 201 may store a set of image bubbles for the geographical region or a subset of image bubbles corresponding to the current location of the mobile device 123. The image bubbles are referenced to geographic locations. The geographic location of each image bubble may be the location from which the image bubble was collected. The memory 201 may also store road segments and nodes, as discussed above, and store renderings of geographic regions.

The input device 203 is configured to receive a selection of a point on a virtual rendering of a geographic region. The virtual rendering may be a three-dimensional model of buildings and other objects. The virtual rendering may include outlines formed from polygons. The input device 203 may be one or more buttons, keypad, keyboard, mouse, stylist pen, trackball, rocker switch, touch pad, voice recognition circuit, or other device or component for inputting data to the mobile device 122. The input device 203 and the display 211 may be combined as a touch screen, which may be capacitive or resistive. The display 211 may be a liquid crystal display (LCD) panel, light emitting diode (LED) screen, thin film transistor screen, or another type of display.

The controller 200, which may be referred to as a processor, is configured to access the set of image bubbles from the memory 201 and select an optimal image bubble. The controller 200 is configured to generate an image including at least a portion of the image bubble in a window within the virtual rendering of the geographic region. The controller 200 is configured cause the display 211 to display the image bubble and the virtual rendering simultaneously. The image bubble may be located near the selected point within the virtual rendering.

The selection of the optimal image bubble may be made by direct correlation in a table. For example, the memory 201 may store a table where each possible point on the virtual rendering of the geographic region is paired with or indexed by an image bubble. Alternatively, the selection of the optimal image bubble may be made via a selection algorithm. Examples selection algorithms are the distance algorithm, the indexing algorithm and the line of sight algorithm, discussed above, which may be performed by the controller 200.

The controller 200 may be configured to calculate a distance between a geographically referenced location of the selected point in the geographic region and each of the set of image bubbles stored in memory 201. The controller 200 may select the image bubble that is closest to the selected point as the optimal image bubble. Alternatively, the controller 200 determines whether a line of sight exists between the geographically referenced location of the selected point and a center of each of the plurality of image bubbles. The determination of whether a line of sight exists can be determined based on a depthmap generated from a location near the center of the image bubble. For example, a line of sight exists when the virtual rendering (building model) intersects the depthmap near the geographically referenced location of the selected point.

The positioning circuitry 207 is optional and may be excluded for the map-related functions. The positioning circuitry 207 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer built or embedded into or within the interior of the mobile device 122. The accelerometer is operable to detect, recognize, or measure the rate of change of translational and/or rotational movement of the mobile device 122. The mobile device 122 receives location data from the positioning system. The location data indicates the location of the mobile device 122.

Figure 9:
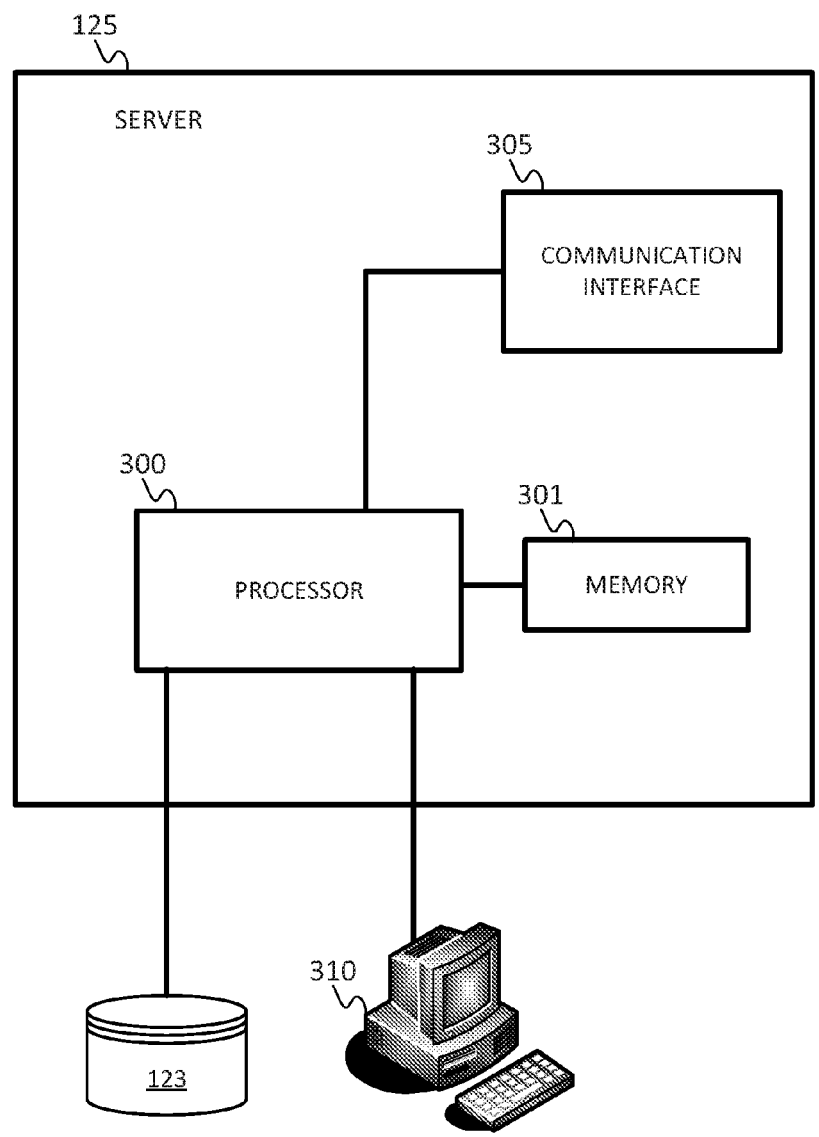
FIG. 9 illustrates an exemplary server of the navigation system of FIG. 1.
Figure 10:
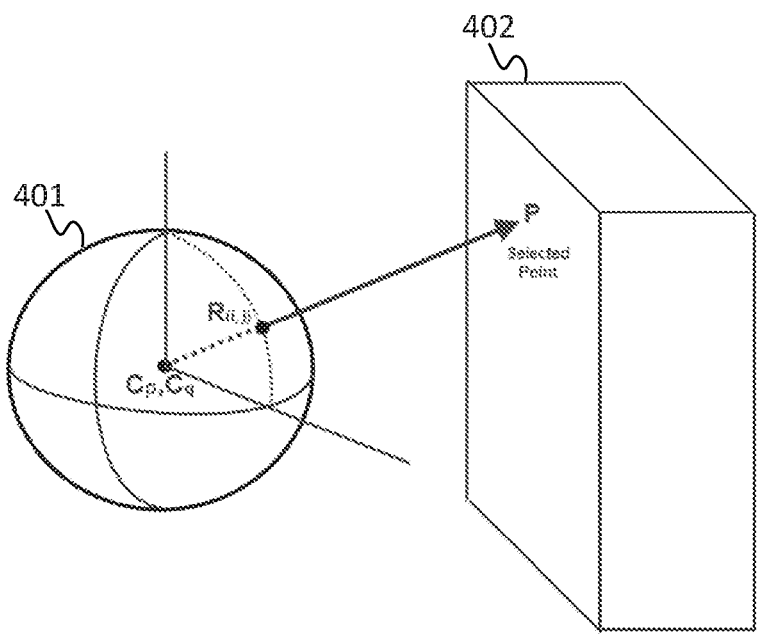
FIGS. 10-13 illustrate embodiments of selection of a region on the image bubble.

FIG. 9 illustrates an exemplary server 125 of the navigation system of FIG. 2. The server 125 includes a processor 300, a communication interface 305, and a memory 301. The server 125 may be coupled to a database 123 and a workstation 310. The database 123 may be a geographic database as discussed above. The workstation 310 may be used as an input device for the server 125. In addition, the communication interface 305 is an input device for the server 125. The communication interface 305 receives data indicative of use inputs made via the workstation 128 or the mobile device 122. In the following endpoint-based embodiments, the server 125 performs a majority of the processing.

Either the memory 301 or the database 123 stores a set of image bubbles. The image bubbles include high resolution images of a scene. The scene may include buildings, roads, sidewalks, or other features. The image bubbles may be stored along with a location value. The location value may be a longitude and latitude of the image bubble.

The processor 300 receives a selection of a point from a mobile device 122 or the workstation 310. The point is a location on the currently displayed image. The currently displayed image may be a building model or other rendering of real world objects. The point may be on a building. The processor 300 may receive the geographic location of the point directly or the processor 300 may determine the geographic location of the point from a depthmap. The processor 300 selects one or more of the set of image bubbles based on the geographic location of the point. The processor 300 generates an image that incorporates at least a portion of the selected image bubble with the currently displayed image. The processor 300 may be configured to convert the spherical image bubble into a planar image or flat image that is incorporated into the display by a direct overlay on the two-dimensional display or by an inset window on the two-dimensional display.

In one embodiment, a texture of an object in the building model is adjusted based on the image data in the image bubble. The texture of the object is a surface of the object. Before selection, the object may be a single color or not colored. Based on the selection of the point on the building model, one or more faces of the object may be colored according to the image bubble. In one example, the processor 300 defines a two-dimensional plane that estimates the surface of the object including the selected point. Pixels of the image data are projected onto the two-dimensional plane in order to color the surface of the object. This process is described in more detail by application Ser. No. 13/340,923, titled "Path Side Imagery" and filed Dec. 30, 2011, which is incorporated by reference in its entirety.

FIGS. 10-13 illustrate selection of a region on the image bubble 401. The server 125 (or mobile device 122) may be configured to calculate, render, and display changes to the street side images as displayed in the virtual rendering. In one example, the input device 203 or workstation 310 is configured to receive a zoom value from the user.

The image has a center position $C_p$ and an orientation $C_q$. Each image bubble 401 is defined by a function of $C_p$ and $C_q$. The orientation $C_q$ may include one to three angles measured from a reference point. When a selection of point P is made. A line from $C_p$ to P intersects the image bubble 401 at exactly one point, R. R is a center point of a region of the surface of the image bubble. R may be defined by a radius, which may be a predefined radius for the image bubble 401, and two angles, i and j. Angle i may be measured from a horizontal plane and angle j may be measured from a vertical plane. The initial radius, or field-of-view (FOV), may be fixed or vary based on a visibility algorithm. The visibility radius may be calculated based on the distance from the image to the selected point or it may be based on the size, type of location of the selected object. Regardless of the algorithm the radius may be later altered in size by the user though a zoom control.

Figure 11:
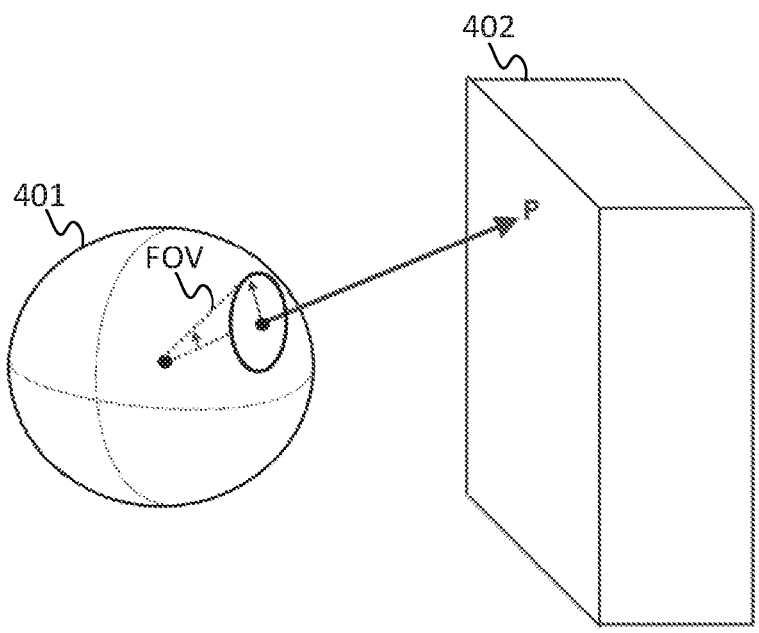

The processor 300 is configured to define a size of the portion of the image bubble, region R, according to the point on building 402, which is the virtual rendering of the geographic region, and the zoom value. As shown in FIG. 11, the zoom value defines the FOV centered at R. In another embodiment, the region may be rectangular or other shape. The portion of the image bubble in the region is extracted or captured from the image bubble 401, as shown in FIG. 11.

Figure 12:
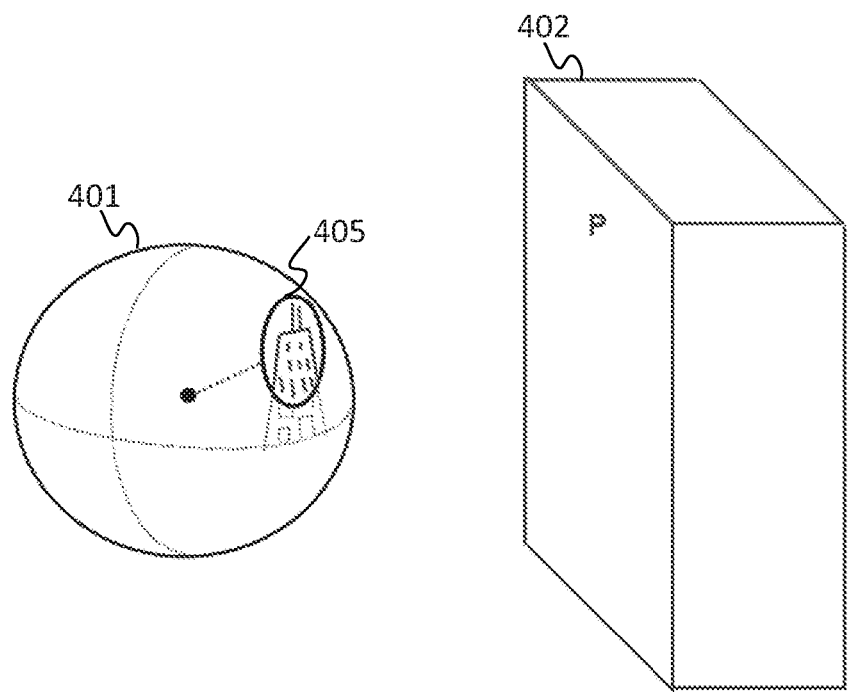

The extracted portion of a panoramic image is generated by projecting a portion of the spherical image onto a planar surface using a perspective transformation centered about the vector from $C_p$ to P and with the specified FOV. The resulting captured two-dimensional image of bubble 401 is presented as a picture-in-picture inset 403 to the virtual rendering of the building 402. The captured portion of the image bubble may be enlarged, reduced, or otherwise manipulated to fit appropriately within the picture-in-picture inset 403. FIG. 12 illustrates a portion 405 of the image bubble 401 that is extracted or captured.

Figure 13:
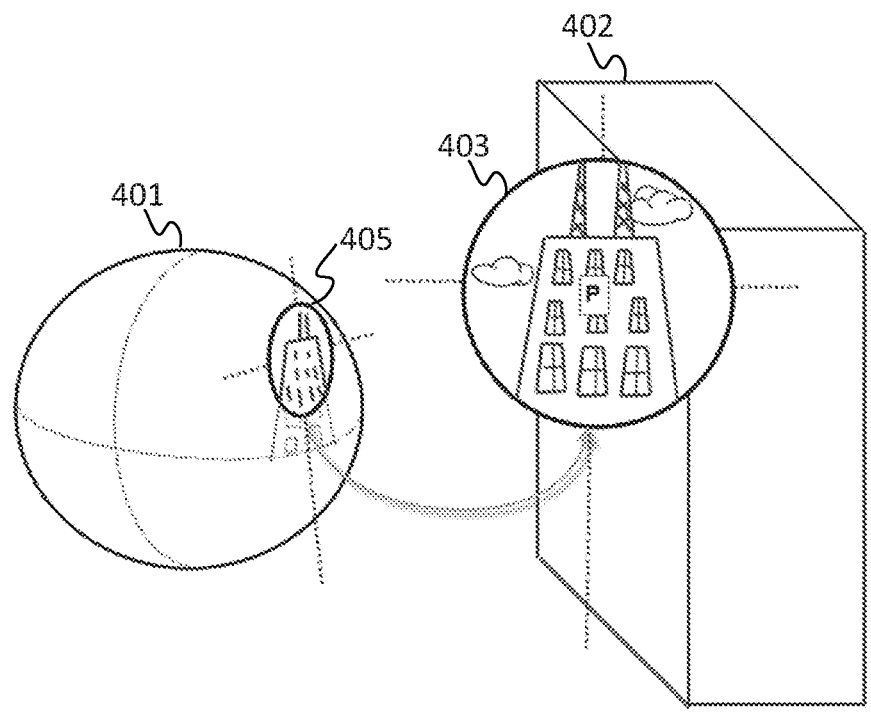

FIG. 13 illustrates that the extracted planar image 405 is taken from a different view angle (from street level looking at the building face) than the current view that the 3D model is being viewed. The extracted street-view image is displayed the picture-in-picture inset 403. The picture-in-picture inset 403 is overlaid on the building model or virtual rendering of the building 402 such that the picture-in-picture inset may be a different scaling and orientation than the building model or virtual rendering of the building 402. Even though the main three-dimensional model scene is currently viewed from above and at an angle that looks from the side of the building (as represented by the 3D block), the inset view allows the user to view the direct, face-on front view of the building and from a pedestrian, street-level viewpoint.

Figure 14:
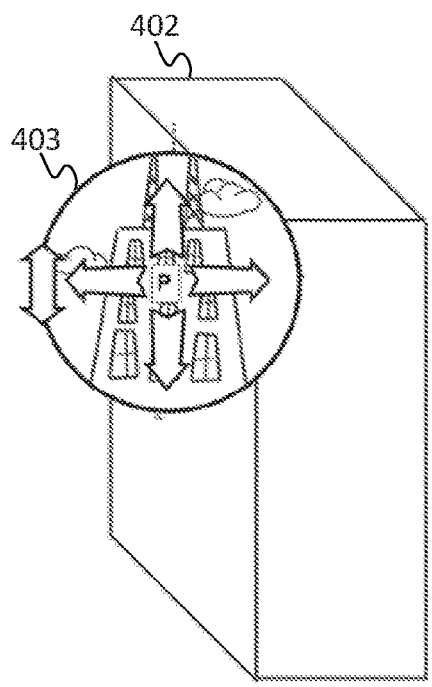
FIG. 14 illustrates a peek view angle control mode, according to one embodiment.

FIG. 14 illustrates a peek view control mode. The peek view control mode allows the user to change the view angle shown in the inset window by re-extracting a different portion of the alternate viewpoint image bubble. Thus the user control is transferred to manipulating the alternate inset viewpoint instead of changing the main three-dimensional model viewpoint. The processor 300 may initiate the peek view control model after the point that has been selected at the street side imagery is displayed in the picture-in-picture window 403. Alternatively, the processor 300 may initiate the peek view control mode based on receipt of a command from the user. The processor 300 is configured to adjust the window within the virtual rendering of the geographic region to display a different portion of the image bubble according to the direction.

Figure 15:
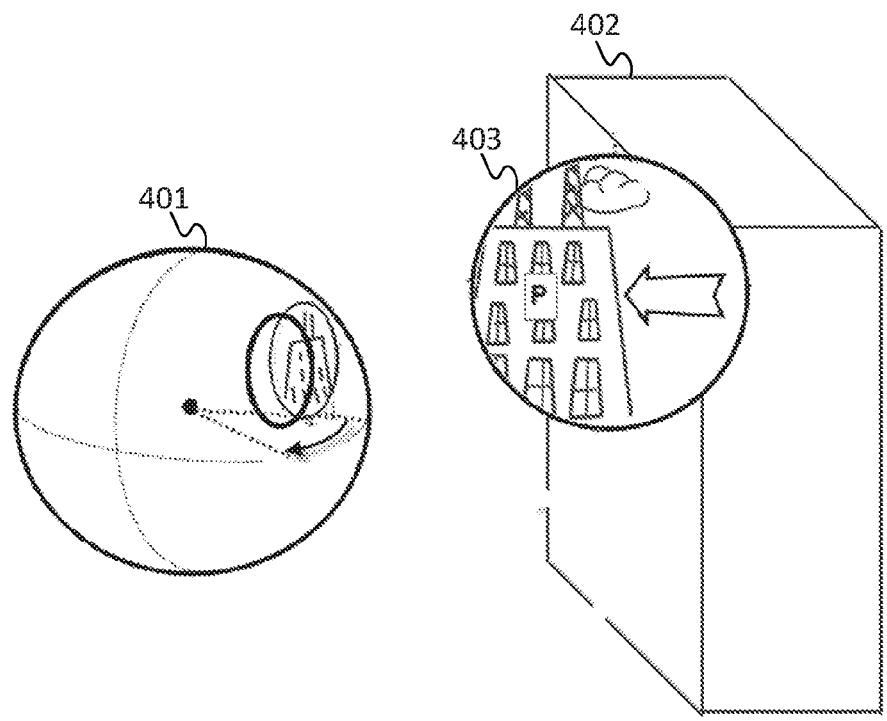
FIGS. 15 and 16 illustrate an embodiment of a pivot mode.
Figure 16:
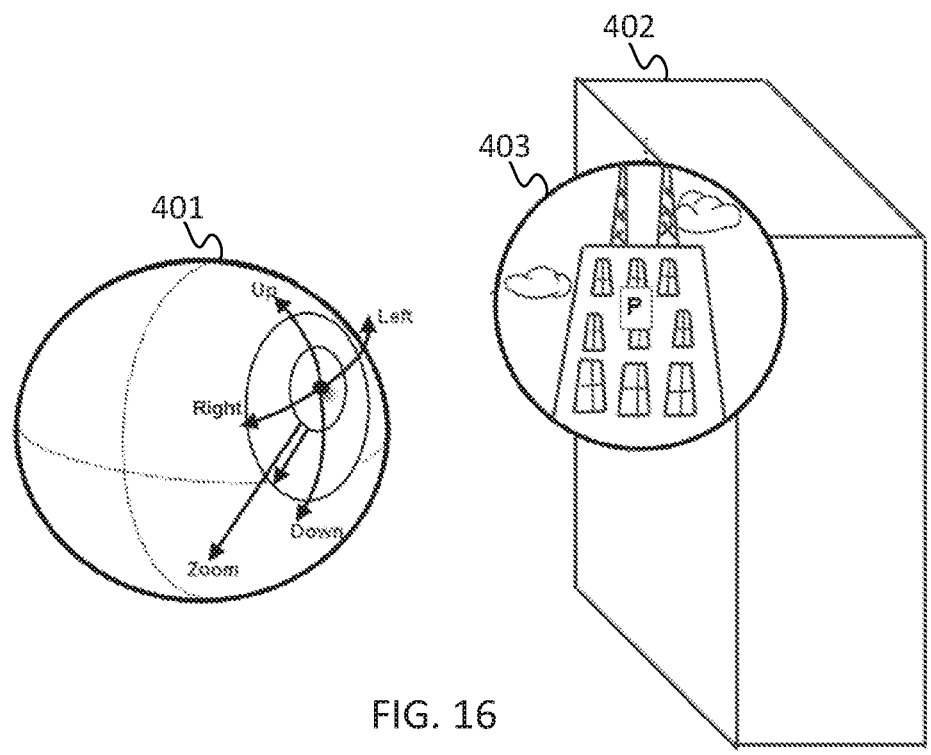
Figure 17:
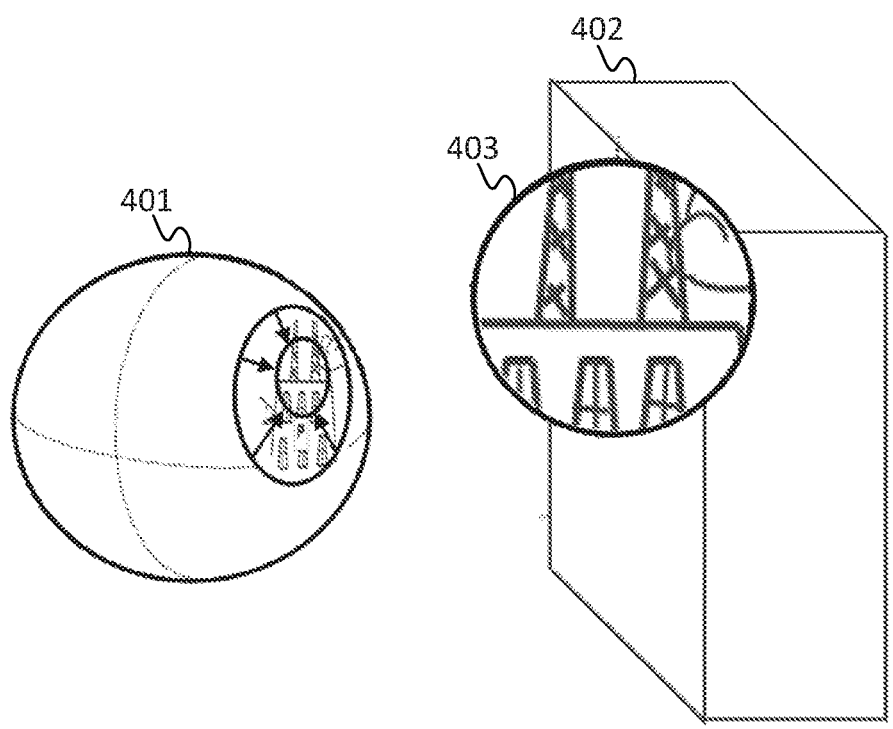
FIG. 17 illustrates an embodiment of a zoom mode.

FIGS. 15 and 16 illustrate a pivot mode, which is one example of the peek view control mode. As shown by FIG. 15, changing the view angle of the window means changing the portion of the image bubble 401 that is displayed in the window. For example, using the left arrow key or moving the mouse left rotates the direction of view within the image bubble. Accordingly, the view shown in the inset window appears to look to the right. This allows the user to arbitrarily look around the scene from the remote/alternate viewpoint of the image bubble. At the same time, the original viewpoint of the three-dimensional model scene is left unchanged. The processor 300 may initiate the pivot mode after the point that has been selected at the street side imagery is displayed in the picture-in-picture window 403. Alternatively, the processor 300 may initiate the pivot mode based on receipt of a command from the user. As shown in FIG. 16, the pivot mode allows the user to adjust the angle of the image bubble. A left or right arrow key or mouse movement pivots the image bubble left and right, and an up or down arrow key or mouse movements pivots the image bubble up and down. In this way, the image bubble is pivoted to show subject matter (e.g., buildings) at locations other than the selected point. FIG. 17 illustrates a zoom mode, which is one example of the peek view control mode. The zoom mode selects the FOV or the amount of the image or number of pixels within the portion of the image bubble that is displayed in the picture-in-picture window 403.

Figure 18:
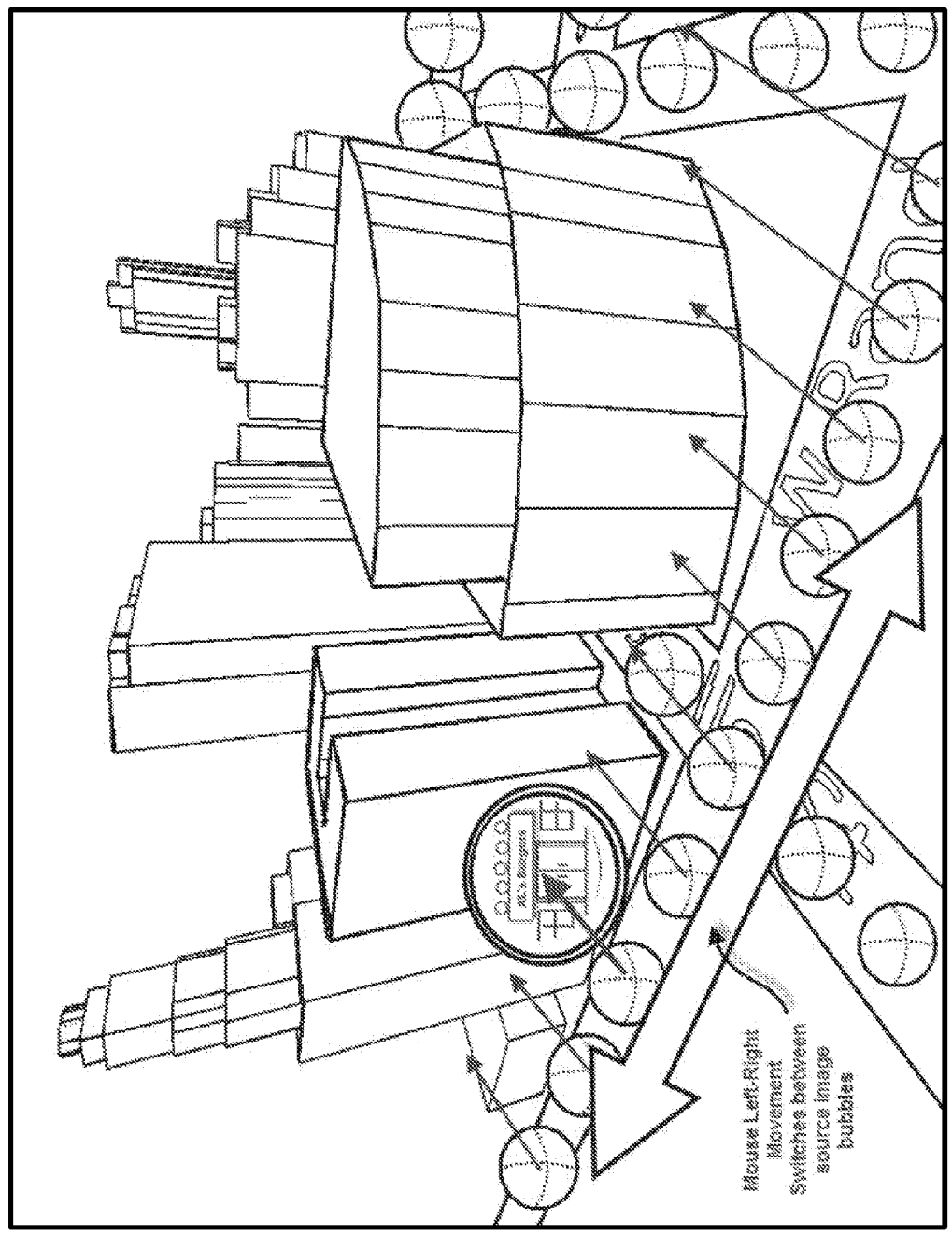
FIG. 18 illustrates an embodiment of a lateral travel movement mode.
Figure 19:
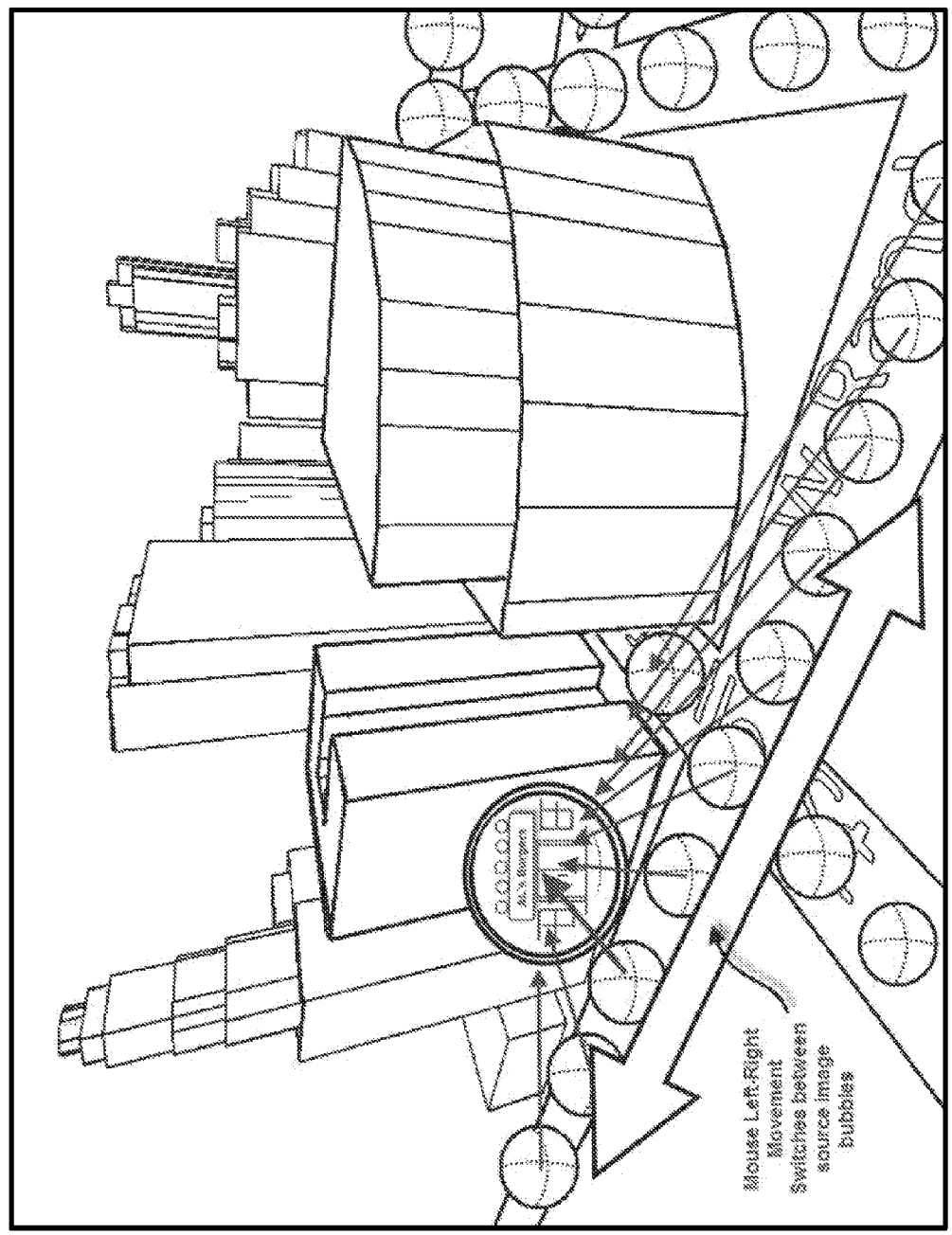
FIG. 19 illustrates an embodiment of a perspective scroll mode.

FIGS. 18 and 19 illustrate a travel image control mode that allows the source image index to change. The travel image control mode may be in a lateral movement mode or a perspective scroll mode along a path or road. The processor 300 is configured to receive an input from the user to select the lateral movement mode of the perspective scroll mode. In the lateral movement mode, as shown by FIG. 18, the view in the picture-in-picture window switches between source images. In the lateral movement mode, a user or mobile device input of a direction is received, and the processor is configured to select subsequent image bubbles based on the direction. For each subsequent image bubble, the processor is configured to generate an image including at least a portion of the new image bubble in the window.

In the perspective scroll mode, as shown by FIG. 19, the view in the picture-in-picture window switches between source images. In the perspective scroll mode, a user or mobile device input of a direction is received, and the processor is configured to select subsequent image bubbles that include an image of the selected point. The processor adjusts the orientation of the subsequent image bubbles so that the picture-in-picture window stays focused on the selected point but at different perspectives. The perspective scroll mode allows the user to scroll through different view of the same subject matter. The perspective scroll mode may be used when an obstruction in the closest image view blocks the view of the object that the user has selected.

Figure 20:
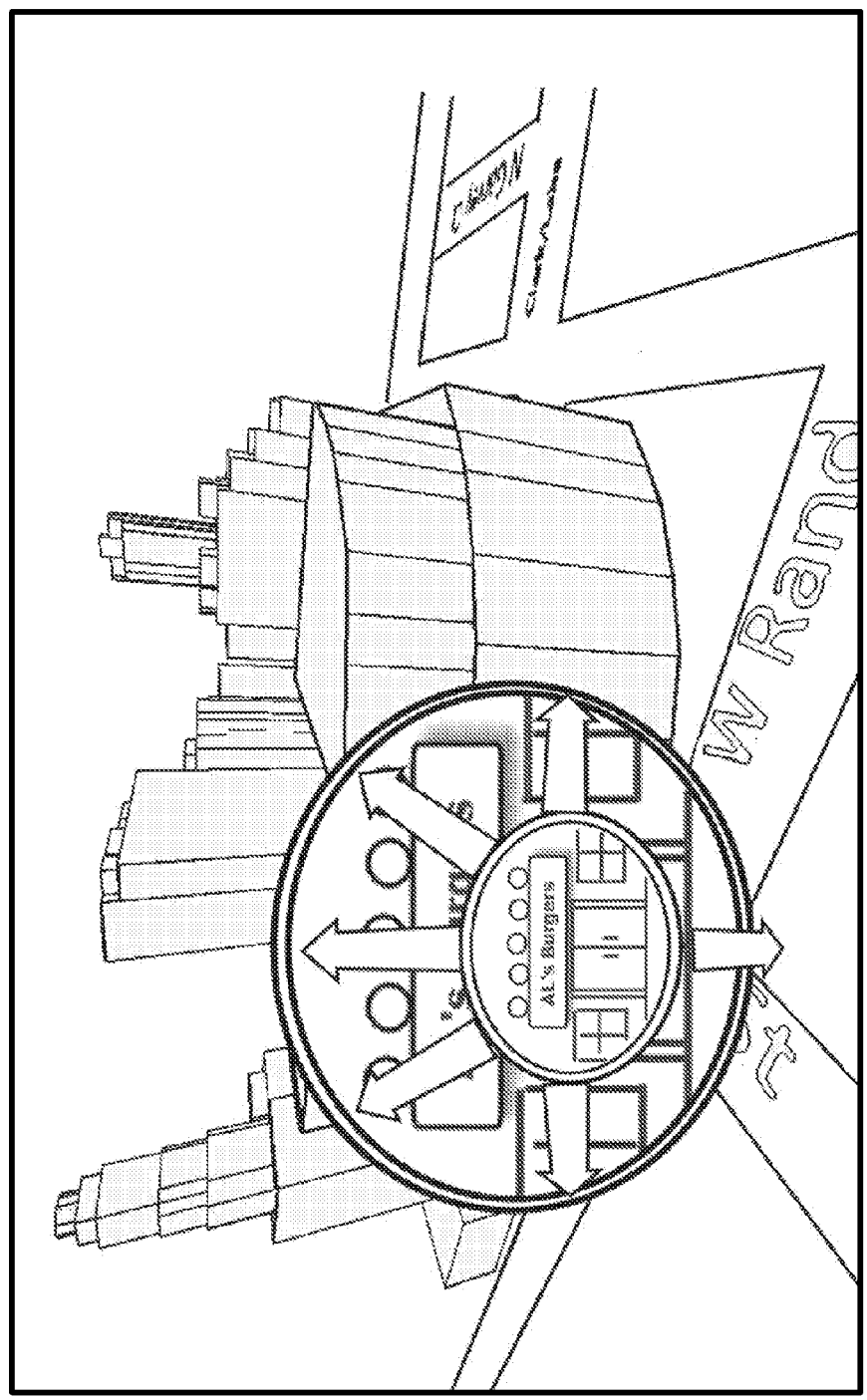
FIG. 20 is another exemplary perspective view including street side imagery where the peek inset expands in size.
Figure 21:
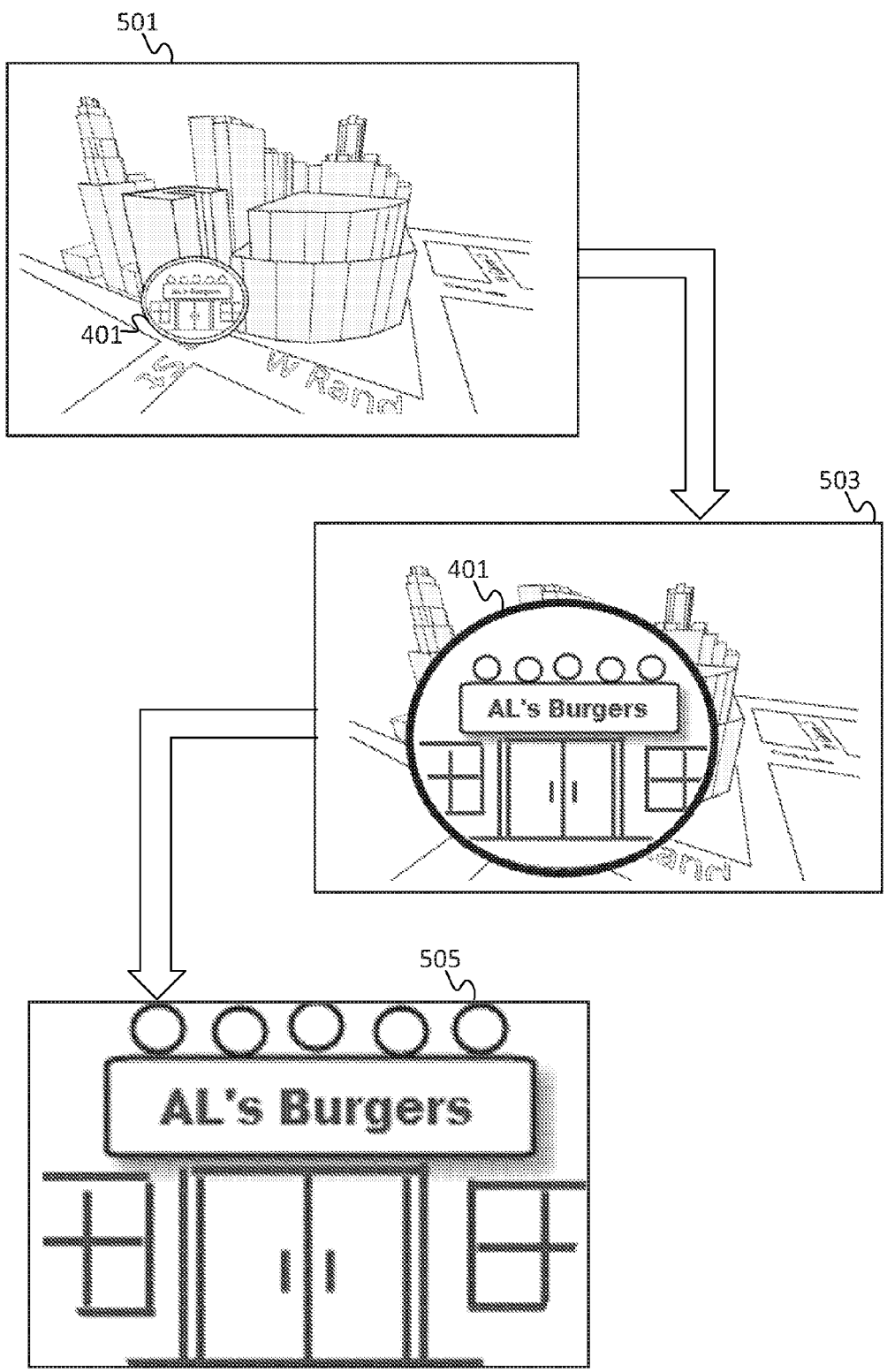
FIG. 21 illustrates an example interface transition between the three-dimensional rendering and the street side imagery.

FIGS. 20 and 21 illustrate another exemplary perspective view including street side imagery. The server 125, the mobile device 123, or the workstation 128 may be configured to provide a seamless interface transition between two different display modes: a $3^{rd}$ person viewpoint showing the virtual model display (eg. building polygon models), and a 1st person viewpoint within the street side image bubble. The transition between the two interfaces is accomplished enlarging the inset picture-in-picture window until the inset picture-in-picture window fills the entire screen. Thus, the transition allows one to navigate from one viewpoint direction and location (3D virtual model viewpoint) to an alternate viewpoint direction and location (defined by the previously selected inset bubble view direction). The transition may be controlled using the zoom function or a scroll bar.

The transition is illustrated as three view ranges in FIG. 21. A full range of scaling may provide a smooth transition. A first view range 510, illustrates the three-dimensional rendering and a small inset window 401 with street side imagery. This inset provides the destination view direction and destination image bubble. As the user zooms into the second view range 503, the small inset window 401 is enlarged. In one example, the peek view control modes and the source image control modes are available during the second view range. As the user zooms into the third view range 505, the three-dimensional rendering is no longer viewable and only street side imagery is displayed to the user. At this point the interface is switched entirely to a $1^{st}$ person view control of the view within the image bubble. Likewise, zooming out of the view may reverse the process to return to the virtual 3D mode viewpoint.

The controller 200 and/or processor 300 may include a general processor, digital signal processor, an application specific integrated circuit (ASIC), field programmable gate array (FPGA), analog circuit, digital circuit, combinations thereof, or other now known or later developed processor. The controller 200 and/or processor 300 may be a single device or combinations of devices, such as associated with a network, distributed processing, or cloud computing.

The memory 201 and/or memory 301 may be a volatile memory or a non-volatile memory. The memory 201 and/or memory 301 may include one or more of a read only memory (ROM), random access memory (RAM), a flash memory, an electronic erasable program read only memory (EEPROM), or other type of memory. The memory 201 and/or memory 301 may be removable from the mobile device 100, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

Figure 22:
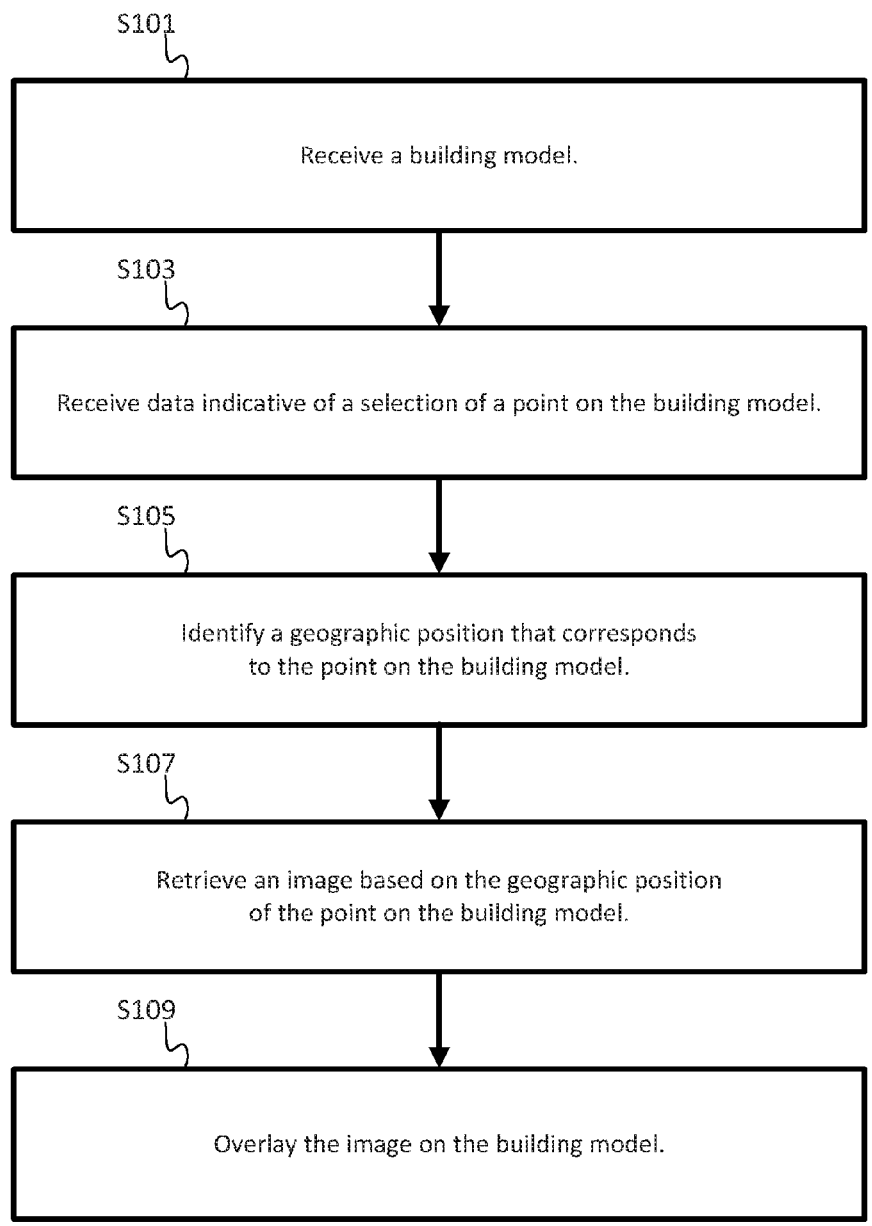
FIG. 22 illustrates an example flowchart for on demand image overlay.

FIG. 22 illustrates an example flowchart for on demand image overlay. The acts of the flowchart may be performed by any combination of the server 125, the mobile device 122 and the workstation 129, and the term controller may refer to the processor of any of the devices. Additional, different, or fewer acts may be provided. For example, acts associated with the different modes may be provided.

At act S101, the controller receives data for a building mode. The data may be loaded from a database or generated by the controller. The building model may be outlines in the shape of the buildings or other outline. The building model may be constructed from depthmap or LiDAR data. Other renderings may be used.

At act S103, the controller receives data indicative of a selection of a point on the building model. The data indicative of the selection of the point may be received from a user input such as the input device 203 or the workstation 128. Alternatively, the data indicative of the selection of the point may be received from another device by way of the network 127. The point may be automatically generated, such as selecting points of interest based on user interests.

At act S105, the controller identifies a geographic position that corresponds to the point on the building model. The building model may include pixel values tied to geographic coordinates.

At act S107, the controller retrieves an image based on the geographic position of the point on the building model. The image may be extracted from an image bubble that is close to the geographic position. The distance from the geographic position of the point on the building model to the center of the image may be calculated using geographic coordinates. Alternatively, each point in the building model may be mapped to an image bubble using a lookup table. In another example, the controller 300 may be configured to determine a line of sight between the center of an image bubble and the selected point on the building model.

At acts S109, the controller overlays the image on the building model. The image and the building model may be arranged into a single view in an image file. The image may be arranged in a picture-in-picture window. The picture-in-picture window is at a scale different than the building model and an orientation different than the building model. The scale and orientation of the picture-in-picture window may be adjusted according to a user input received at the input device 203 or the workstation 128. In one example, the picture-in-picture window is omitted and the image is overlaid in a shape of a surface of an object in the building model. In other words, the image becomes a texture of the object in the building model.

Figure 23:
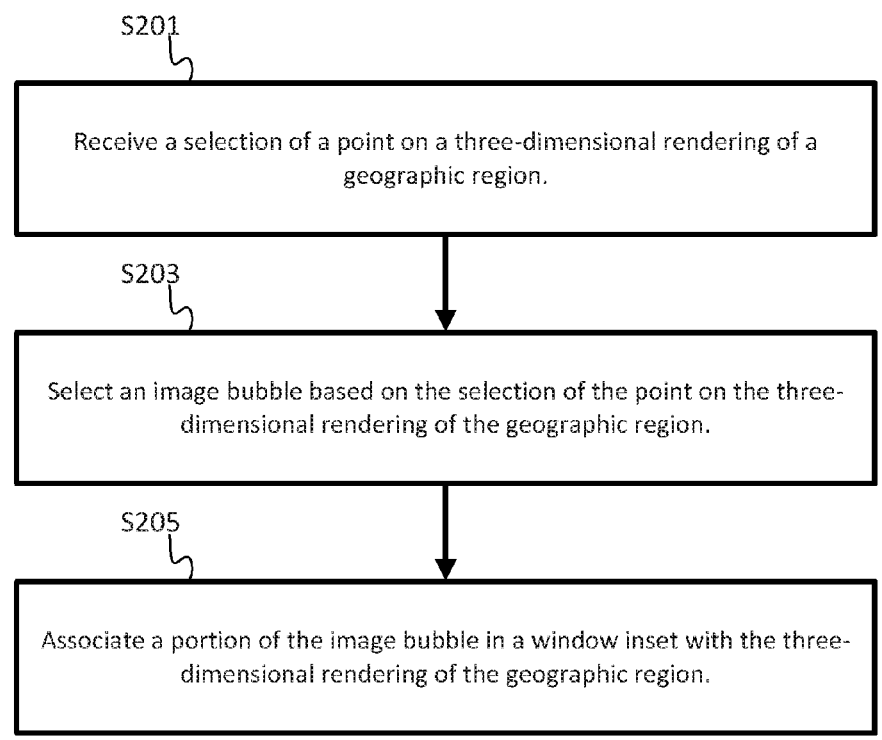
FIG. 23 illustrates another example flowchart for on demand image overlay.

FIG. 23 illustrates another example flowchart for on demand image overlay. The acts of the flowchart may be performed by any combination of the server 125, the mobile device 122 and the workstation 129, and the term controller may refer to the processor of any of the devices. Additional, different, or fewer acts may be provided. For example, acts associated with the different modes may be provided.

At act S201, the controller receives data indicative of a selection of a point on a three-dimensional rendering of a geographic region. The data indicative of the selection of the point may be received from a user input such as the input device 203 or the workstation 128. The selection of the point may correspond with the calculation of a route. The selected point may be a destination of the route, a guidance feature along a route, or a point of interest.

At act S203, the controller selects an image bubble based on the selection of the point on the three-dimensional rendering of the geographic region. The selection of the image bubble may be according to any of the above algorithms. At act S205, the controller associates a portion of the image bubble in a window inset within the three-dimensional rendering of the geographic region. The association may include incorporating the window inset into the current display. The association may include generating a new image including the portion of the image bubble and a portion of the three-dimensional rendering. The image portion may represent a different viewpoint than the viewpoint of the current display. The association may also include selecting the portion of the image bubble to extract by calculating a view angle for the at least the portion of the image bubble and calculating a field of view radius for the at least the portion of the image bubble.

The controller may also be configured to project the portion of the image bubble onto a planar image, which is overlaid onto the three-dimensional rendering of the geographic region at a viewpoint that is different than the three-dimensional rendering. The viewpoint of the inset window may be at angle defined by and in the direction of the selected point. The three-dimensional rendering and the window inset may be represented by different styles. For example, the three-dimensional rendering does not necessarily directly match the image bubbles. That is, the projection of the image bubble may not match the side of the three-dimensional rendering.

The embodiments above may be applied to or combined with image enhancement for composite images or alternate view images as described by co-pending U.S. application Ser. No. 13/536,536, (and Publication No. 2014/0002439, titled "Alternate Viewpoint Image Enhancement") to James D. Lynch filed Jun. 28, 2012, which is incorporated by reference in its entirety.

The network 127 may include wired networks, wireless networks, or combinations thereof. The wireless network may be a cellular telephone network, an 802.11, 802.16, 802.20, or WiMax network. Further, the network 127 may be a public network, such as the Internet, a private network, such as an intranet, or combinations thereof, and may utilize a variety of networking protocols now available or later developed including, but not limited to TCP/IP based networking protocols.

While the non-transitory computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions.

Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

I claim:

1. A method comprising:
receiving data indicative of a selection of a point on a three-dimensional rendering of a geographic region;
selecting, using a processor, an image bubble based on the selection of the point on the three-dimensional rendering of the geographic region; and
associating, using the processor, at least a portion of the image bubble in a window inset with the three-dimensional rendering of the geographic region,
wherein the window inset is at a viewpoint that is different than the three-dimensional rendering, wherein the viewpoint is based on the selected point,
wherein the image bubble is collected from a single perspective and the image bubble is closest among available image bubbles to the selected point and line of sight to the selected point and wherein the available image bubbles are panoramic images.

2. The method of claim 1, wherein associating the at least the portion of the bubble in the window inset with the three-dimensional rendering of the geographic region comprises:
calculating a view angle for the at least the portion of the image bubble; and
calculating a field of view radius for the at least the portion of the image bubble.

3. The method of claim 2, further comprising:
projecting the at least the portion of the image bubble onto a planar image.

4. The method of claim 1, wherein the selection of the point corresponds to a navigation route or a point of interest.

5. The method of claim 1, further comprising:
determining a geographically referenced location from the selection of the point on the three-dimensional rendering of the geographic region; and
identifying a plurality of image bubbles based on the geographically referenced location.

6. The method of claim 5, wherein:
the plurality of image bubbles are identified based on distance from a center of each of the image bubbles to the geographically referenced location; or
the plurality of image bubbles are identified based on whether an image of each of the image bubbles corresponds to the geographically referenced location; or
the plurality of image bubbles are identified based on whether a line of sight exists between the geographically referenced location and a center of each of the plurality of image bubbles.

7. The method of claim 1, further comprising:
receiving data indicative of a user input of a direction; and
adjusting the window inset within the three-dimensional rendering of the geographic region to display a different portion of the image bubble according to the direction without changing the three-dimensional rendering of the geographic region.

8. The method of claim 1, further comprising:
receiving data indicative of a user input of a direction;
selecting a second image bubble based on the direction; and
displaying at least a portion of the second image bubble in the window inset within the three-dimensional rendering of the geographic region.

9. An apparatus comprising:
a memory storing a plurality of image bubbles, wherein the plurality of image bubbles are panoramic images; and
a processor configured to receive a selection of a point associated with a virtual rendering of a geographic region and configured to access the plurality of image bubbles and select an optimal image bubble from the plurality of image bubbles based on the selection of the point on the virtual rendering of the geographic region,
wherein the processor is configured to generate an image including at least a portion of the optimal image bubble in a window inset within the virtual rendering of the geographic region, wherein the window inset is at a viewpoint that is different than the virtual rendering of the geographic region, wherein the image bubble has a collection point closest, as compared to the plurality of image bubbles, to the point of the virtual rendering of the geographic region and line of sight to the point.

10. The apparatus of claim 9, wherein the processor is configured to receive a zoom value and the processor is configured to define a size of the portion of the image bubble according to the point on the virtual rendering of the geographic region and the zoom value.

11. The apparatus of claim 9, wherein the processor is configured to receive data indicative of a user input of a direction, and the processor is configured to adjust the window inset within the virtual rendering of the geographic region to display a different portion of the image bubble according to the direction.

12. The apparatus of claim 9, wherein the processor is configured to receive data indicative of a user input of a direction, and the processor is configured to select a second image bubble based on the direction and generate a second image including at least a portion of the second image bubble in the window inset within the virtual rendering of the geographic region.

13. The apparatus of claim 9, wherein the processor is configured to determine a geographically referenced location from the selection of the point on the virtual rendering of the geographic region and the plurality of image bubbles are determined according to the geographically referenced location.

14. The apparatus of claim 13, wherein the plurality of image bubbles are identified based on distance from a center of each of the image bubbles to the geographically referenced location.

15. The apparatus of claim 13, wherein the plurality of image bubbles are identified based on whether an image of each of the image bubbles is indexed to the geographically referenced location.

16. The apparatus of claim 13, wherein the plurality of image bubbles are identified based on whether a line of sight exists between the geographically referenced location and a center of each of the plurality of image bubbles.

17. A non-transitory computer readable medium including instructions that when executed are operable to:

receive data of a building model;

receive data indicative of a selection of a point on the building model;

identify a geographic position that corresponds to the point on the building model;

select an image from a plurality of images, wherein the selected image has a collection point closest to the geographic position among the plurality of images and a line of sight the point on the building model and wherein the plurality of images are panoramic images;

retrieve the selected image based on the geographic position of the point on the building model; and overlay a portion of the selected image on the building model in a window inset, wherein the window inset is at a viewpoint that is different than the building model.

18. The non-transitory computer readable medium of claim 17, wherein a resolution of the selected image is greater than a resolution of the building model.

\* \* \* \* \*